A. R. WILLIAMS.
TRACTION LOCOMOTIVE.
APPLICATION FILED OCT. 4, 1919.

1,334,577.

Patented Mar. 23, 1920.
3 SHEETS—SHEET 1.

INVENTOR
Albert R. Williams,
By
W. G. Henbow,
Attorney

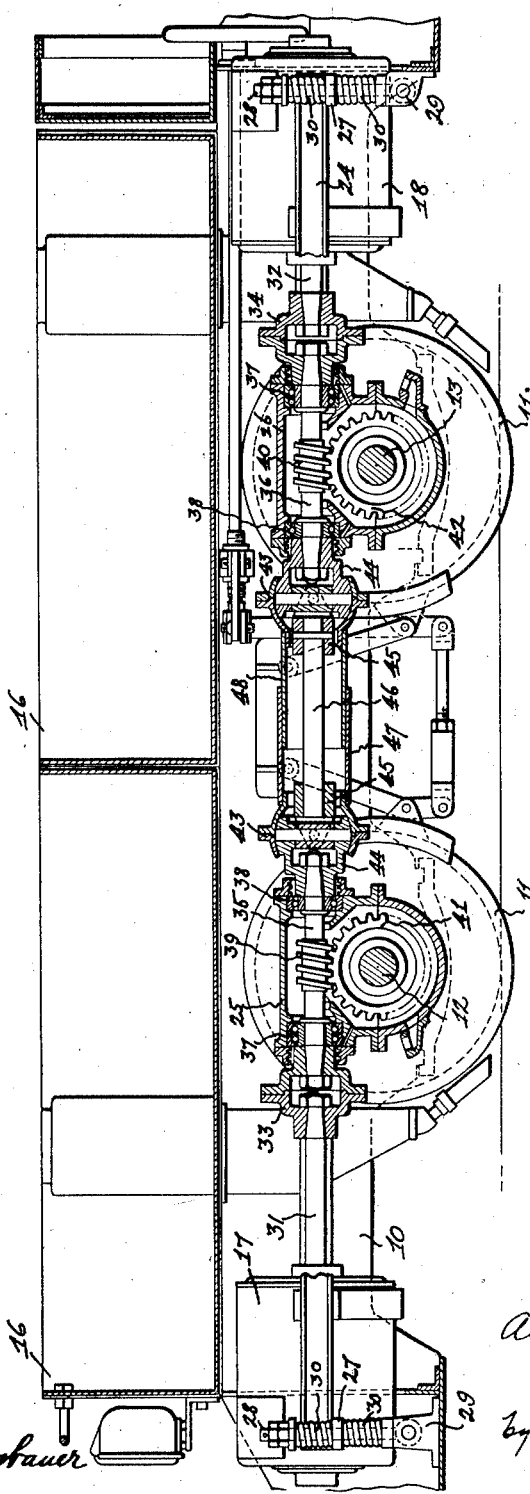

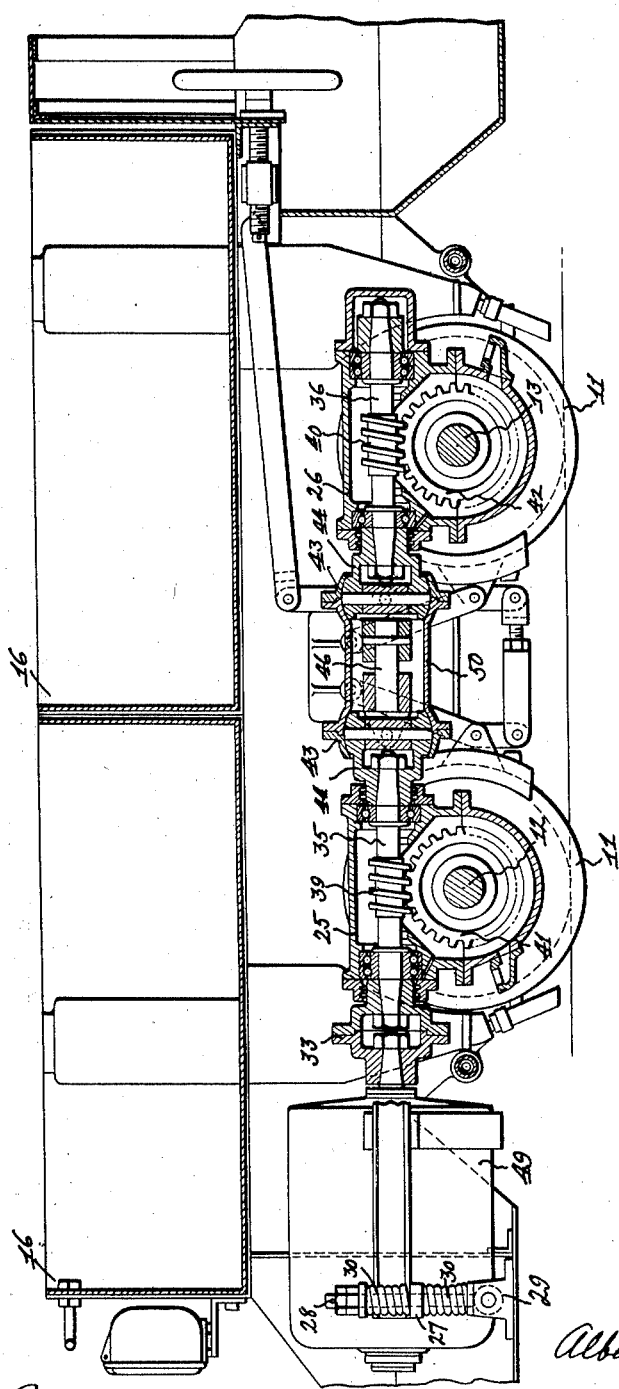

UNITED STATES PATENT OFFICE.

ALBERT R. WILLIAMS, OF IRONTON, OHIO, ASSIGNOR TO THE IRONTON ENGINE COMPANY, OF IRONTON, OHIO, A CORPORATION OF OHIO.

TRACTION-LOCOMOTIVE.

1,334,577.	Specification of Letters Patent.	Patented Mar. 23, 1920.

Application filed October 4, 1919. Serial No. 328,358.

*To all whom it may concern:*

Be it known that I, ALBERT R. WILLIAMS, a citizen of the United States of America, residing at Ironton, in the county of Lawrence and State of Ohio, have invented certain new and useful Improvements in Traction-Locomotives, of which the following is a specification.

This invention relates to new and useful improvements in traction locomotives for pulling or carrying loads in mining, construction, or other work, where conditions are such that proper traction is hard to obtain due to uneven or wet tracks, sharp curves and similar conditions.

The object of my invention is to provide a method of driving the axles and wheels of this locomotive, whereby the axles will be connected together, so that they will be operated in unison, by this method a much greater traction can be secured than when the axles are driven separately.

In my invention I propose to transmit the power from an electric motor or other suitable source of power to the traction wheels, through gearing applied in such a manner that the motor, gearing, and axles, and wheels will not be bound or cramped and the several parts will be free to assume their relative positions as operating conditions demand.

With the above and other objects in view, this invention resides in the novel features of construction, formation, combinations, and arrangements of parts to be hereinafter more fully described and particularly pointed out in the appended claims.

In the drawings, in which similar reference characters indicate the same parts in the several figures, Figure 1 is a plan view of the truck and propelling mechanism employed in the preferred form of my invention;

Fig. 3 is an enlarged longitudinal vertical section with parts in elevation taken through the axis of the driving shaft, and Fig. 4 is a similar sectional view of a modified form of my invention.

Figure 1:
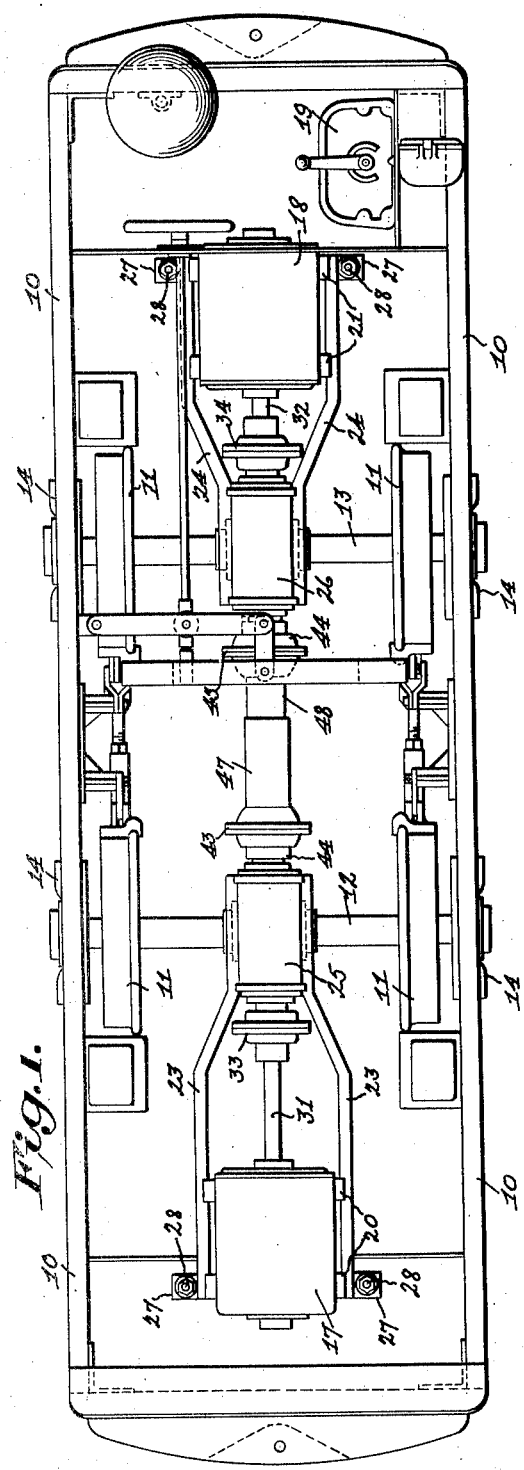

Referring to the accompanying three sheets or drawings, the numeral 10 designates in general the truck consisting of a rectangular frame supported on wheels 11 which are mounted on axles 12 and 13 and provided with axle housing, and bearings 14. The axle housings are cast with suitable recesses to receive springs 15 for flexibly supporting the truck frame 10.

Suitable compartments 16 adapted to receive storage batteries for operating driving motors 17 and 18 may be mounted on the truck in case the locomotive is to be driven from storage batteries, however it may be driven by power from other sources. A controller 19 is mounted on the frame conveniently located for the operator and has suitable connections from the battery or other source of power and with the driving motors 17 and 18.

The driving motors 17 and 18 are located at opposite ends of the truck and supported by straps 20 and 21 attached to truss bars 23 and 24. The truss bars 23 and 24 are fastened at their adjacent ends to the gear housings 25 and 26 respectively and their opposite ends are provided with apertured lugs 27. These lugs receive bolts 28 pivoted to supporting blocks 29 and springs 30 are placed upon the bolts on opposite sides of the lugs 27 and nuts 30 hold them in compression. Thus the motors will be supported and maintained in proper position by the connection of the truss bars 23 and 24 with the gear casings and will be flexibly supported by the truck frame 10.

The armature shafts 31 and 32, of motors 17 and 18 are connected by flexible, or as illustrated, solid couplings 33 and 34 with driving shafts 35 and 36 which are mounted in ball bearings 37 which are a combination of radial and thrust bearings to take both radial and thrust loads, and ball bearings 38 in the gear housings 25 and 26. These driving shafts 35 and 36 are provided with worms 39 and 40 which engage gears 41 and 42 mounted on axles 12 and 13 for driving them. Attached to the other ends of the driving shafts 35 and 36 are flexible or universal couplings 43 comprised of parts 44 and 45, the part 45 of each coupling having an opening preferably square in shape to receive a shaft 46 which is free to slide in one of the parts 45. A portion of each of the couplings is made spherical to receive connecting sleeves 47 and 48, one of which telescopes inside the other. These sleeves form a housing for the universal joints to protect them from dirt or grit and are adapted to be filled with a lubricant; the telescopic connection permits each gear housing 26 and 27, to assume its respective position regardless of the other.

Figure 2:
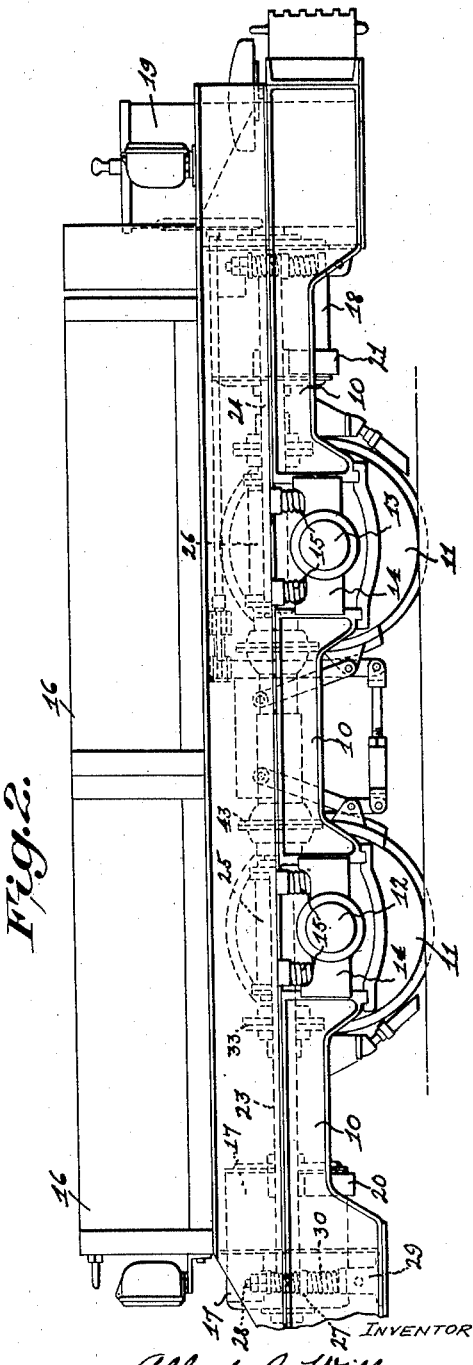
Fig. 2 is a side elevation thereof.

Referring to Fig. 4, it will be seen that the general construction of this locomotive is very similar to that shown in Figs: 1, 2 and 3, except that it is of the single motor type, having a motor 49 located near one end of the locomotive. A single sleeve 50, in place of two sleeves 47 and 48 of the form disclosed in Figs. 1, 2 and 3, is employed.

In both embodiments of my invention, I may rigidly support the motors or motor in the frame of the locomotive, in which case flexible couplings in place of the solid couplings 33 and 34 are used between the motors and the gearing, and proper means for holding the gearing and housing in their positions are provided.

The operation of the invention is as follows:

When the controller 19 is operated to apply energy to the motor or motors 17 and 18, an endwise thrust along the armature and driving shafts will be caused, due to the resistance or friction of the gears and other parts and wheels 11 on the track. The truss bars 23 and 24 connected with the gear housings 25 and 26 which are also connected with and support the motors limit this endwise thrust and the springs 30 which engage the lugs 27 on these bars tend to absorb the shock of the thrust in either direction when the motors are starting. The flexible connection between the driving shafts 35 and 36 permits the parts to be easily connected and disconnected as desired, and allows a flexibility between the driven elements. The single piece sleeve 50 used in the form shown in Fig. 4, acts as a connection between the gear housings 25 and 26 tending to maintain these housings in proper relation with each other, and to transmit the thrust from the housing 26 remote from the motor 49 on through to the spring support 27.

It will be seen that in this construction each set of axles is free to adjust itself to any inequalities of the track and the motors are located near the ends of the locomotive where they will be easily accessible for inspection or removal for repairs.

I have illustrated my invention employing worm gearing for driving the wheel axles since it permits the application of this kind of drive by the use of the smallest number of parts and is also stronger and safer than spur or bevel gearing and can be maintained in better alinement. It is also quiet in operation which is desirable, especially in mine service, where the absence of noise will make it much easier for the operator to hear the signals of other locomotives. However, it is within the scope of my invention to use either form of gearing.

From the foregoing disclosures, taken in connection with the accompanying drawings, it will be manifest that locomotives such as described are provided, which will fulfil all the necessary requirements of such devices, it being understood that various minor changes in the specific details of construction can be resorted to within the scope of the appended claims without departing from, or sacrificing any of the advantages of the invention.

I do not herein claim the specific construction of the double motor type as shown for example in Figs. 1, 2 and 3, as this will be made the subject-matter of a separate and independent application.

What I claim is:—

1. A traction locomotive comprising a main frame supporting wheels supporting said frame, driving mechanism adjacent an end of the frame for driving all the wheels thereof, axles for said wheels, driving shafts to be driven by the driving mechanism, a driving connection between each driving shaft and a wheel axle, a universal driving connection between the adjacent ends of the driving shafts and a casing surrounding said universal driving connection.

2. In a traction locomotive, the combination of a main frame suitably supported on four driving wheels, axles for said driving wheels, suitable gearing mounted on each axle, a driving shaft for each axle and having a gear thereon adapted to drive the corresponding gear on the axle, a gear housing for each set of gears, a flexible connection between the driving shafts, and means comprising a casing for connecting the gear housings.

3. In a traction locomotive, the combination of a main frame suitably supported on four driving wheels, axles for said driving wheels, suitable gearing mounted on each axle, a driving shaft for each axle having a gear thereon adapted to drive the corresponding gear on the axle, a gear housing for each set of gears, a flexible connection between the driving shafts, means comprising a casing for connecting the gear housings and for containing a lubricant for the parts, a motor near one end of the frame, means for supporting and holding the motor in proper relation with said gear housings, and means for flexibly connecting the motor with the frame.

4. In a traction locomotive the combination of a main frame section suitably supported on four driving wheels, axles for said driving wheels, a driving shaft for each axle having a driving connection therewith, means for connecting the driving shafts, means for holding each driving shaft in its proper position, a motor connected with one of said driving shafts, means for supporting and holding the motor in proper relation with said driving shaft, and means for flexibly supporting the motor on the frame.

5. In a traction locomotive, the combination of a main frame suitably supported on four driving wheels, axles for said driving wheels, a driving shaft for each wheel axle having a driving connection therewith, a housing for each driving connection, a universal driving connection between adjacent ends of the driving shafts, a casing for the universal driving connection adapted to flexibly connect the housings.

6. In a traction locomotive, the combination of a main frame suitably supported on four driving wheels, axles for said driving wheels, a driving shaft for each wheel axle having a driving connection therewith, a housing for each driving connection, a universal driving connection between adjacent ends of the driving shafts, a casing for the universal driving connection adapted to flexibly connect the housings, operating means for rotating said driving shafts, means for supporting and holding said operating means in proper relation with the driving shafts, and means for flexibly supporting the operating means on the frame.

7. A traction locomotive comprising a frame having supporting wheels, a driving motor adjacent an end of the frame for driving all the wheels thereof, axles for said wheels, driving shafts to be driven by the motor, a driving connection between each driving shaft and a wheel axle, means for supporting and holding the motor in proper relation with one of said driving shafts, and means for flexibly supporting the motor on the frame.

8. A traction locomotive comprising a frame having supporting wheels, a driving motor adjacent an end of the locomotive for driving all the wheels thereof, axles for said wheels, driving shafts to be driven by the motor, a driving connection between each driving shaft and a wheel axle, means for connecting the adjacent ends of the driving shafts, a housing for each driving connection, and means connected with the housings for supporting and holding the motor in proper relation with the driving shaft in said housing.

In testimony whereof I affix my signature.

ALBERT R. WILLIAMS.